Figure 1:
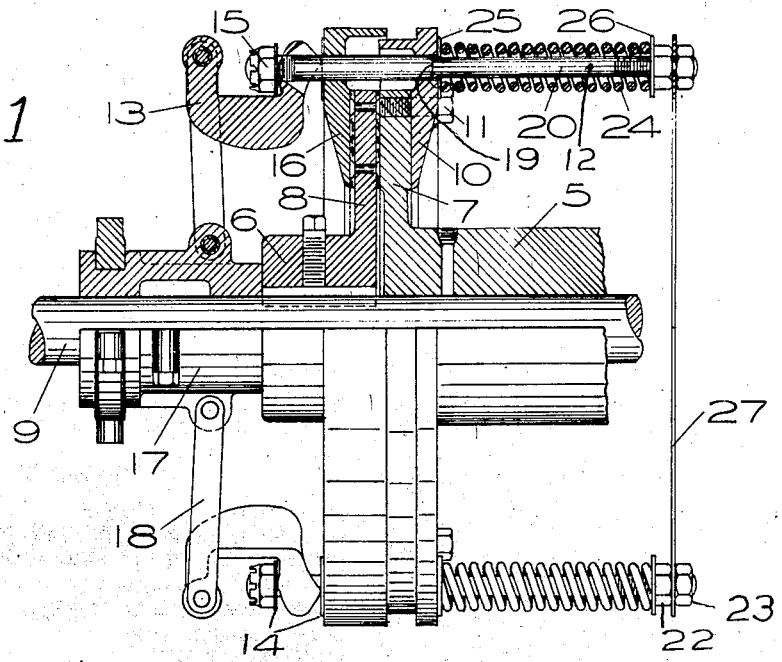

July 31, 1945.  J. T. BARRON  2,380,572

DISENGAGEABLE SLIP CLUTCH

Filed March 10, 1944

*INVENTOR.*
JOHN T. BARRON
BY
*Spear, Rawlings & Spear*
ATTORNEYS

Patented July 31, 1945

2,380,572

UNITED STATES PATENT OFFICE 2,380,572

DISENGAGEABLE SLIP CLUTCH

John T. Barron, Boston, Mass., assignor to Kinney Manufacturing Company, Jamaica Plain, Mass., a corporation of Massachusetts Application March 10, 1944, Serial No. 525,863

4 Claims. (Cl. 192—68)

My present invention relates to novel clutches combining the advantage of slip clutches and clutches adapted to be selectively engaged and disengaged.

In many installations, it is necessary to protect the transmission or power source against overloads. Slip clutches are superior to shear pin connections since, with the former, the drive is resumed without the necessity of service when the cause of the overload has been eliminated. There are, however, many installations where the transmission must be coupled and uncoupled as well as safeguarded against overloads and it is to such uses that clutches in accordance with my invention are particularly adapted.

Clutches in accordance with my invention utilize novel means to clamp the clutch elements together. Said clutches comprise driving, driven members, and a clamping member with either the driving or driven member being slidable relative to the other. In accordance with my invention, the members slidably support the clamping member and also provides supports on which are springs held constrained when the shifter mechanism is inoperatively positioned and which are unseated by relative movement between the supports and one of the clutch members when said shifter mechanism is operatively positioned to provide clamping pressure on the clutch members determining the torque capacity of the clutch.

Actuation of the shifter from its inoperative to its operative position effects movement between the supports and the unseating member. This movement unseats the springs so that they exert an element coupling pressure on the clamping member to provide a slip coupling of a desired torque capacity. When the shifter is inoperatively positioned, the springs, as they reseat, reestablish the inoperative relation between the supports and the members so that the clutch is uncoupled.

By this construction, I am able to provide reliable clutches of simple construction capable of being readily adjusted to meet a wide range of conditions where selective operation and protection against overloads is desired.

In the accompanying drawing, I have shown an illustrative embodiment of my invention from which its several novel features and advantages will be readily apparent.

Figure 2:
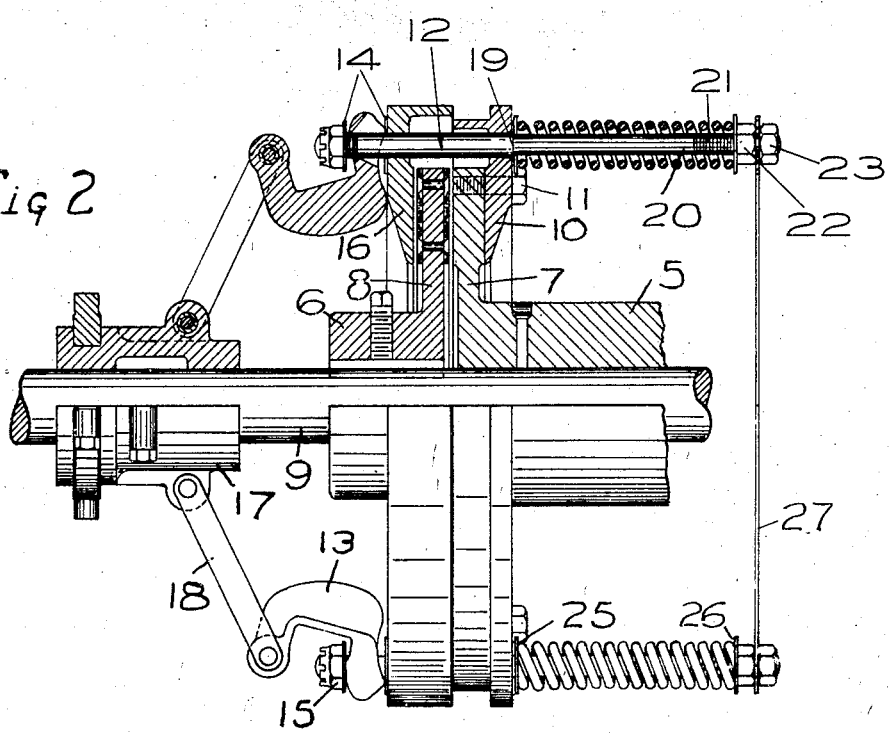

In the drawing:

Fig. 1 is a partly sectioned view of a clutch in accordance with my invention showing its engaged position, and Fig. 2 shows the clutch of Fig. 1 in its disengaged position.

In the embodiment of my invention shown in the drawing, the clutch consists of a pair of hubs 5 and 6 each having annular flanges 7 and 8, respectively, constituting flat discs. The hub 5 may be regarded as part of a pulley or the like slidable with reference to the shaft 9 to which the hub 6 is fast but where a cut-off coupling is desired, the hub 5 is slidably keyed to its own shaft.

An annular support 10 is bolted to the flange 7 of the hub 5 as at 11 and is formed with a plurality of spaced bores to slidably receive bolts generally indicated at 12. Cams 13 are supported by the bolts 12 in engagement with the washers 14, one of which is backed by nuts 15 locked to the bolts 12 and the other of which is backed by the annular clamping plate 16 slidably supported by the bolts 12 so that as the cams are actuated, the bolts are thrust towards the left, as viewed in the drawing. The cams 13 may be conventionally actuated by a shifter sleeve 17 slidable on the shaft 9 to which and to the cams 13 links 18 are pivotally connected.

In accordance with my invention, the bolts 12 are shouldered as at 19 to provide an end portion 20 of reduced diameter threaded as at 21 to receive the nuts 22 and 23 by which the compression of the spring 24 on each of the supporting bolts 12 and normally seating washer elements 25 and 26 against the shoulders 19 and the nuts 22 respectively may be adjusted. Where desired, and particularly for high speed clutches, I interconnect the ends of the bolts 12 by a ring 27 locked between the nuts 22 and 23 to restrain the force developed by rotating motion.

The annular clamping member 16 is engageable with the flange 8 of the hub 6 to clamp the flanges 7 and 8 together. As shown in the drawing, when the clutch is disengaged, the clamping member 16 is positioned relative to the bolts 12 so that the washer elements 25 are seated against the shoulders 19 so that the springs 24 are inoperative to cause clutch engagement.

When the cams 13 are actuated by movement of the shifter sleeve 17, the bolts 12 are urged to the left to bring the washer elements 25 against the supporting member 10 so that the spring pressed elements are unseated and the springs 24 are effective to provide clamping pressure on the clamping member 16 effective to clamp the disc 7 against the disc 8. As the clamping pressure is determined by the compression of the springs 24 and as their compression may be adjusted as desired, the clutch functions as a slip clutch in the event of a load in excess of a predetermined maximum. At the same time, the clutch is adapted to be engaged and disengaged since when the shifter 17 is inoperatively positioned the clamping member 16 and the bolts 12 are inoperatively positioned by the reseating of the spring pressed elements and the clutch is disengaged.

My invention may be readily incorporated in many different types of clutches to provide an efficient and durable means of coupling driving and driven elements while protecting the transmission against overloads.

What I therefore claim and desire to secure by Letters Patent is:

1. In a clutch, shifter means having an operative and an inoperative position, driving and driven clutch elements one of which is slidable with reference to the other, and means operable by said shifter means to clamp said clutch elements together, said means comprising supports slidably carried by one of said clutch elements in parallel with its axis, a spring constrained on each of said supports, and a clamping element slidably carried by said support to engage with the other of said clutch elements, said clamping element and said supports being positioned relative to each other when said shifter means is operatively positioned to cause said support carrying clutch element to unseat said springs so that they provide clamping pressure on said clutch elements determining the torque capacity of the clutch and being inoperatively positioned relative to each other by the seating of said springs when said shifter means is in its inoperative position.

2. The clutch of claim 1 in which each of the supports has a shoulder adjacent the support carrying clutch element by which the springs are unseated and has a washer engageable by the support-carrying clutch element between it and one end of the spring, and means on the other end of the support engageable with the other end of each spring to adjust the compression thereof.

3. The clutch of claim 1 in which a ring interconnects the outer ends of the supports to restrain them against the influence of centrifugal force.

4. In a clutch, shifter means having an operative and an inoperative position, driving and driven clutch elements one of which is slidable with reference to the other, means operable by said shifter means to clamp said clutch elements together, said means comprising a clamping element and supporting means on one of said clutch elements slidably supporting said clamping element, a spring on each of said supporting means, and means constraining said springs when said shifter means is inoperatively positioned, said means being rendered inoperative when said shifter means is operatively positioned to cause relative movement between said last named clutch element and said supporting means so that said springs provide clamping pressure on said clutch elements.

JOHN T. BARRON.